(12) United States Patent
Sorenson et al.

(10) Patent No.: US 10,053,016 B2
(45) Date of Patent: Aug. 21, 2018

(54) STEP SYSTEMS AND KITS FOR RECREATIONAL VEHICLES

(71) Applicant: Winnebago Industries Inc.

(72) Inventors: Jamie Sorenson, Forest City, IA (US);
Bryan Aitchison, Forest City, IA (US);
Troy Webber, Forest City, IA (US);
Mark Fure, Forest City, IA (US)

(73) Assignee: Winnebago Industries Inc., Forest City, IA (US)

( * ) Notice: Subject to any disclaimer, the term of this patent is extended or adjusted under 35 U.S.C. 154(b) by 0 days.

(21) Appl. No.: 15/677,605

(22) Filed: Aug. 15, 2017

(65) Prior Publication Data
US 2018/0056879 A1    Mar. 1, 2018

Related U.S. Application Data

(60) Provisional application No. 62/380,728, filed on Aug. 29, 2016.

(51) Int. Cl.
| | |
|---|---|
| *B60R 3/00* | (2006.01) |
| *B60R 16/03* | (2006.01) |
| *B60R 3/02* | (2006.01) |
| *B60P 3/36* | (2006.01) |

(52) U.S. Cl.
CPC ............ *B60R 3/007* (2013.01); *B60R 3/02* (2013.01); *B60R 16/03* (2013.01); *B60P 3/36* (2013.01)

(58) Field of Classification Search
CPC . B60R 3/02; B60R 3/007; B60R 16/03; B60P 3/32; B60P 3/36
See application file for complete search history.

(56) References Cited

U.S. PATENT DOCUMENTS

| | | | | | |
|---|---|---|---|---|---|
| 560,752 | A | * | 5/1896 | Prator | ............... E06C 1/387 182/156 |
| 3,858,905 | A | * | 1/1975 | Peebles | ............... B60R 3/007 182/106 |
| 5,547,040 | A | * | 8/1996 | Hansen | ............... B60R 3/02 182/127 |
| 6,655,706 | B1 | * | 12/2003 | Murrell | ............... B60R 3/02 182/88 |
| D537,399 | S | * | 2/2007 | Riddle | ............... D12/203 |
| 2007/0205573 | A1 | * | 9/2007 | Hallmark | ............... B60R 3/02 280/163 |
| 2012/0098231 | A1 | * | 4/2012 | Huotari | ............... B60R 3/02 280/166 |
| 2015/0123374 | A1 | * | 5/2015 | Smith | ............... B60R 3/02 280/166 |

* cited by examiner

*Primary Examiner* — Brian L Swenson
(74) *Attorney, Agent, or Firm* — Faegre Baker Daniels LLP

(57) ABSTRACT

Certain embodiments of the present disclosure are directed to a step system for attaching to a recreational vehicle, which includes an automatic step system. The step system includes a step frame that is configured to be removably coupled to the recreational vehicle. The step frame includes a plurality of steps and a magnet. The step system further includes a magnetic proximity switch that is configured to disable the automatic step system when the step frame is in an installed position.

17 Claims, 5 Drawing Sheets

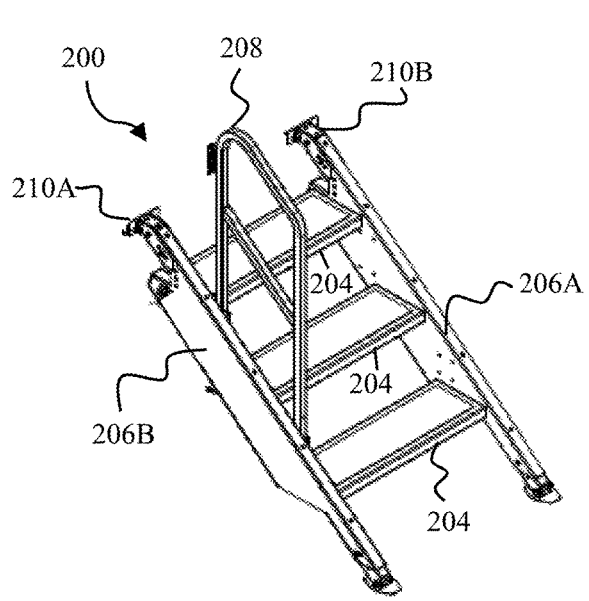
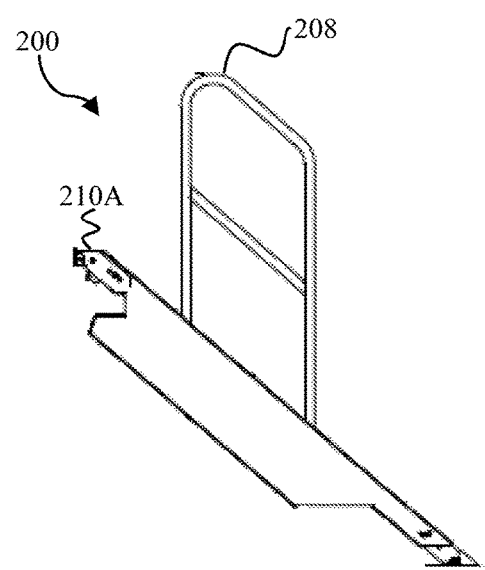
FIG. 3
FIG. 4

STEP SYSTEMS AND KITS FOR
RECREATIONAL VEHICLES

RELATED APPLICATIONS

This application claims priority to Provisional Application No. 62/380,728, filed Aug. 29, 2016, which is herein incorporated by reference in its entirety.

TECHNICAL FIELD

The disclosed technology relates generally to step systems and step system kits for recreational vehicles.

BACKGROUND

The present disclosure relates to step systems that can be attached to recreational vehicles, which meet Recreational Vehicle Industry Association (RVIA) safety standards. Current RVIA safety standards require a recreational vehicle to include a step that automatically deploys and remains deployed when an entrance door to the recreational vehicle is open. Currently, the steps used in the industry to meet RVIA safety standards break easily with daily commercial foot traffic because of the construction necessary for automatic deployment. Installing a static step during parking would interfere with the automatically-deploying step. To keep the automatically-deploying step from deploying, a manual switch could be used. However, it would be easy for a user to forget to toggle the manual switch, which would render the automatically-deploying step inoperable and therefore unable to meet the RVIA safety standards.

Thus, there is a need for step systems that can be attached to recreational vehicles without interfering with the automatic step and without compromising compliance with RVIA safety standards.

BRIEF SUMMARY

Certain embodiments of the present disclosure are directed to a step system for attaching to a recreational vehicle, which includes an automatic step system. The step system includes a step frame that is configured to removably coupled to the recreational vehicle. The step frame includes a plurality of steps and a magnet. The step system further includes a magnetic proximity sensor that is configured to disable the automatic step system when the step frame is in an installed position.

Certain embodiments of the present disclosure are directed to step system kit with has component parts being capable of being assembled to be removably attached to a recreational vehicle to disable an automatic step system. The step system kit includes the combination of a step frame and a magnetic proximity sensor. The step frame is configured to be removably coupled to the recreational vehicle and includes a plurality of steps and a magnet. The magnetic proximity sensor is configured to disable the automatic step system when the step frame is in an installed position.

While multiple embodiments are disclosed, still other embodiments of the disclosure will become apparent to those skilled in the art from the following detailed description, which shows and describes illustrative embodiments of the disclosed apparatus, systems, and methods. As will be realized, the disclosed apparatus, systems and methods are capable of modifications in various obvious aspects, all without departing from the spirit and scope of the disclosure.

Accordingly, the drawings and detailed description are to be regarded as illustrative in nature and not restrictive.

BRIEF DESCRIPTION OF THE DRAWINGS

FIG. 3 is a perspective view of the step system of FIG. 1.

FIG. 4 is a side view of the step system of FIG. 1.

DETAILED DESCRIPTION

The various embodiments disclosed or contemplated herein relate to step systems and assemblable step system kits that can be attached to recreational vehicles, which meet RVIA safety standards.

Figure 1:
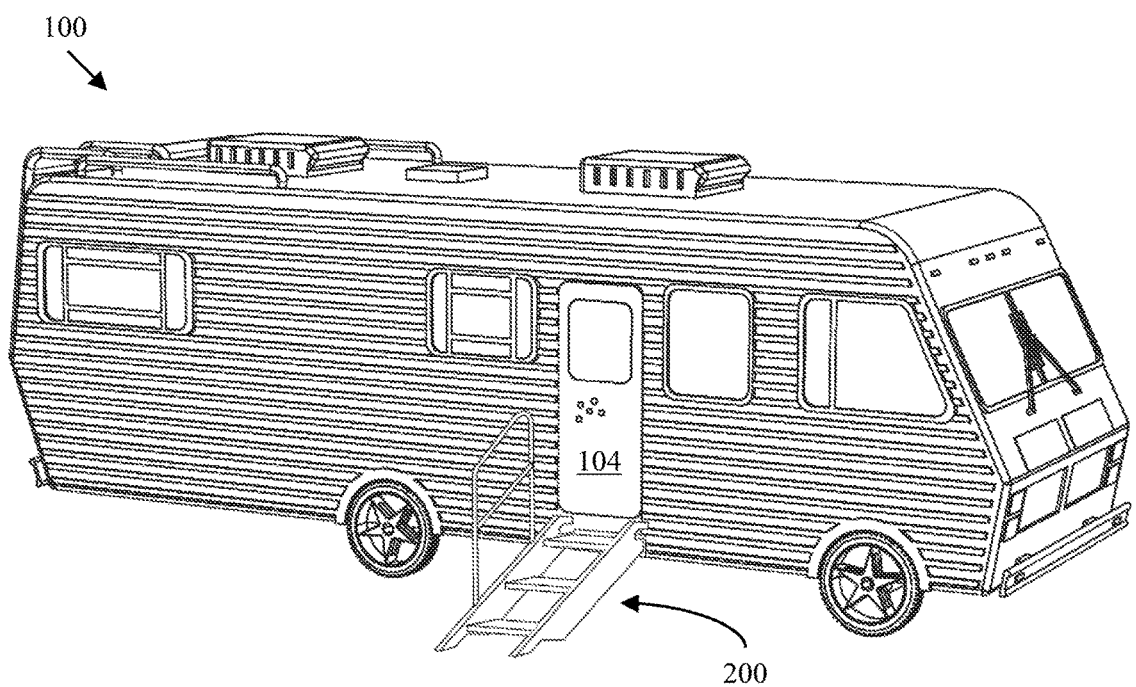
FIG. 1 is a perspective view of a recreational vehicle and an attached step system, in accordance with certain embodiments of the present disclosure.
Figure 2:
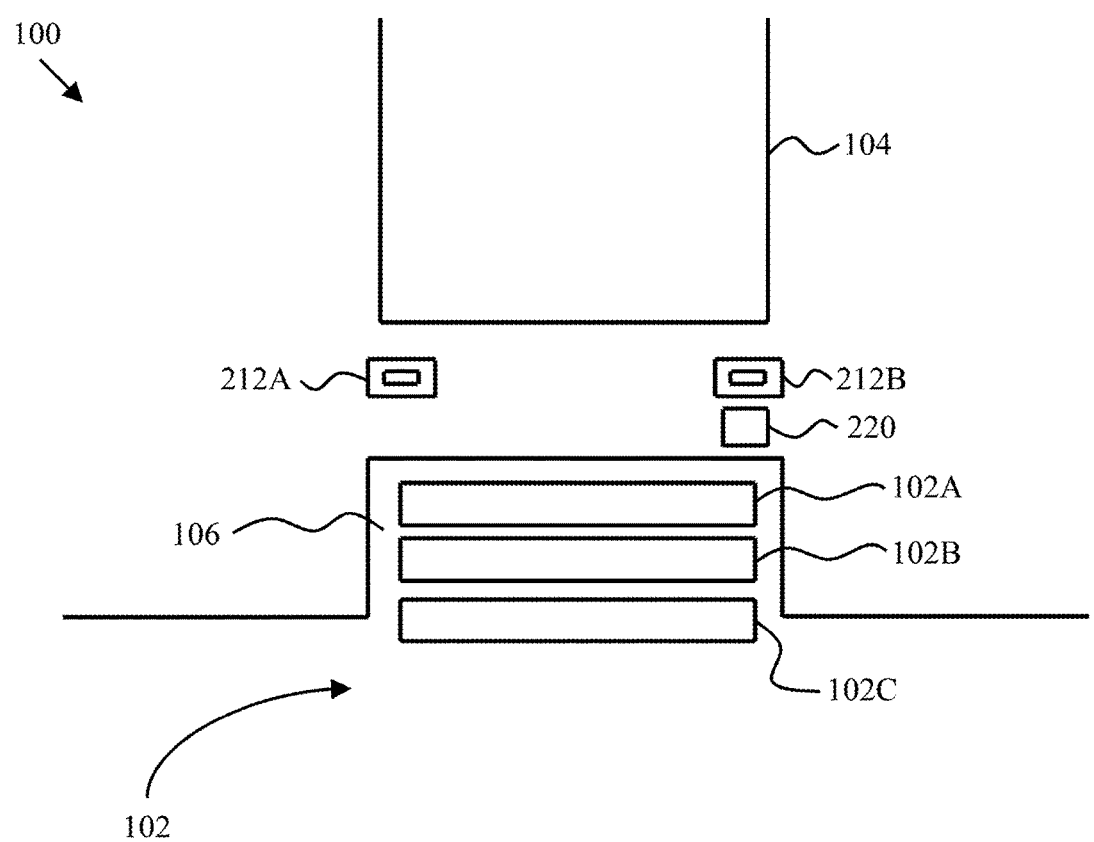
FIG. 2 is a schematic of a partial side view of the recreation vehicle of FIG. 1 including an automatic step system.

FIG. 1 is a perspective view of a recreational vehicle 100 and a step system 200 attached to the recreational vehicle 100. FIG. 2 is a schematic of part of the recreation vehicle 100, which includes an automatic step system 102 with multiple steps 102A, 102B, 102C and installed below an entrance door 104 in a bay 106 of the recreational vehicle 100. As described above, the RVIA safety standards require recreational vehicles to include a step that automatically deploys and remains deployed when the entrance door 104 to the recreational vehicle 100 is open. These automatic step systems break easily. As will be described in more detail below, the step system 200 provides an alternative set of steps that are sturdier than conventional automatic step systems. The step system 200 also provides a mechanism to disable the automatic step system 102 from deploying when the step system 200 is in an installed position.

Figure 5:
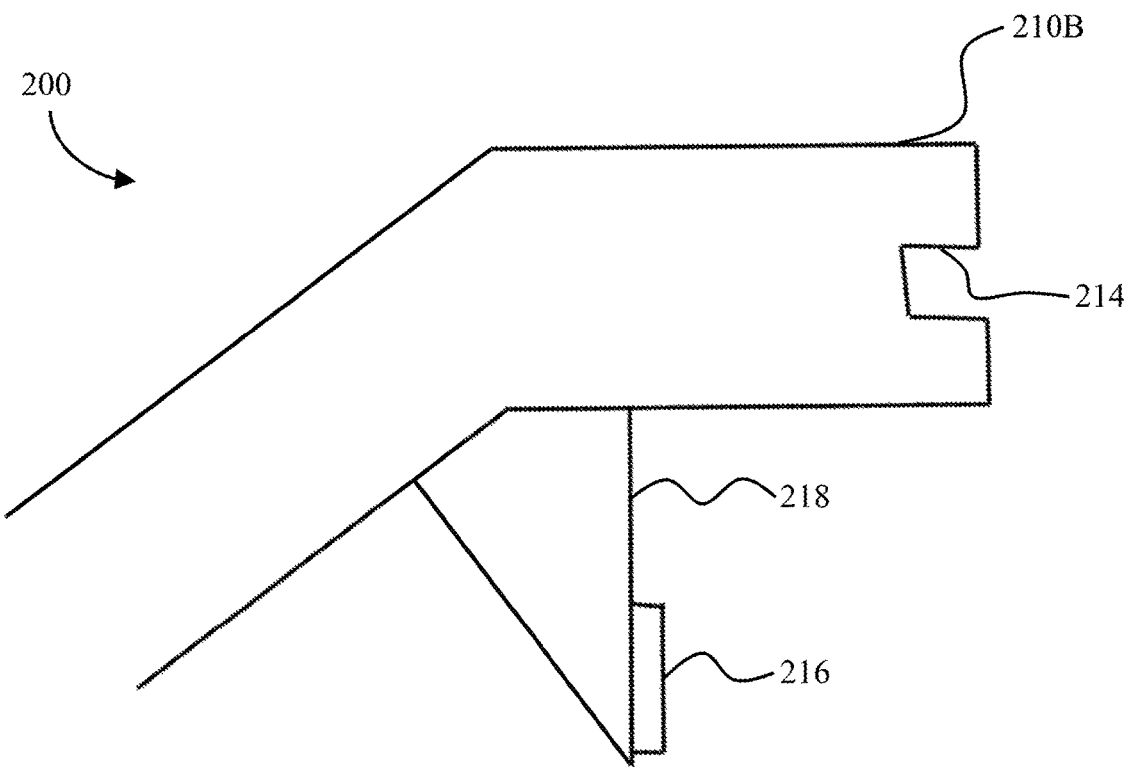
FIG. 5 is a partial side view of the step system of FIG. 1.

As shown in FIG. 3, the step system 200 includes a step frame 202 that includes a plurality of steps 204 and a first side 206A and a second side 206B. The plurality of steps 204 and the first side 206A and the second side 206B can be fixedly disposed relative to one another. In certain embodiments, the step system 200 includes a handle 208. FIGS. 3, 4, and 5 show the step system 200 including a first mount 210A and a second mount 210B. The first mount 210A and the second mount 210E are configured to be removably attached to the corresponding brackets (e.g., a first bracket 212A and a second bracket 212B shown in FIG. 2). The first bracket 212A and the second bracket 212B may be attached to a side of the recreational vehicle 100 near the entrance door 104. As shown in FIG. 5, the first mount 210A and the second mount 210B may each include a notch 214 that is shaped to engage with either of the first bracket 212A and the second bracket 212B. The step frame 202 is considered to be in an installed position when the step frame 202 is attached to the recreational vehicle 100. FIG. 1 shows the step frame 202 attached to the recreational vehicle 100 in the installed position.

The step system 200 includes a magnet 216 attached to a bracket 218 of the step system 200. The magnet 216 is positioned on the step system 200 such that, when the step frame 202 is in an installed position, the magnet 216 is positioned near a magnetic proximity sensor 220 (shown in FIG. 2). The magnetic proximity sensor 220 is attached to the recreational vehicle 100 (e.g., by rivets or other fasteners) and is in electrical communication (e.g., via wires) with a circuit configured to control operation of the automatic step system 102. As shown in FIG. 2, the magnetic proximity sensor 220 is attached to the recreational vehicle 100 below the entrance door 104 and below the first bracket 212A and the second bracket 212B. As such, when the step frame 202 is in the installed position, the magnet 216 and the magnet proximity sensor 220 interact such that the automatic step system 102 is deactivated. For example, when the magnet 216 is in proximity with the magnetic proximity sensor 220, the magnetic proximity sensor 220 can detect the presence of the magnet 216 and, in response to detecting the presence of the magnet 216, communicate with the circuit of the automatic step system 102 such that the automatic step system 102 cannot be electrically powered on. The magnetic proximity sensor 220 acts like an on/off switch for the automatic step system 102 (e.g., off when the magnet 216 is in proximity to the magnetic proximity sensor 220 and on when the magnet 216 is positioned away from magnetic proximity sensor 220). When the step frame 202 is uninstalled (e.g., detached from the recreational vehicle 100) and the magnet 216 is moved away from the magnetic proximity sensor 220, the automatic step system 102 can be powered on to allow steps to be deployed. Accordingly, the recreational vehicle 100 is able to meet RVIA safety standards.

Figure 6:
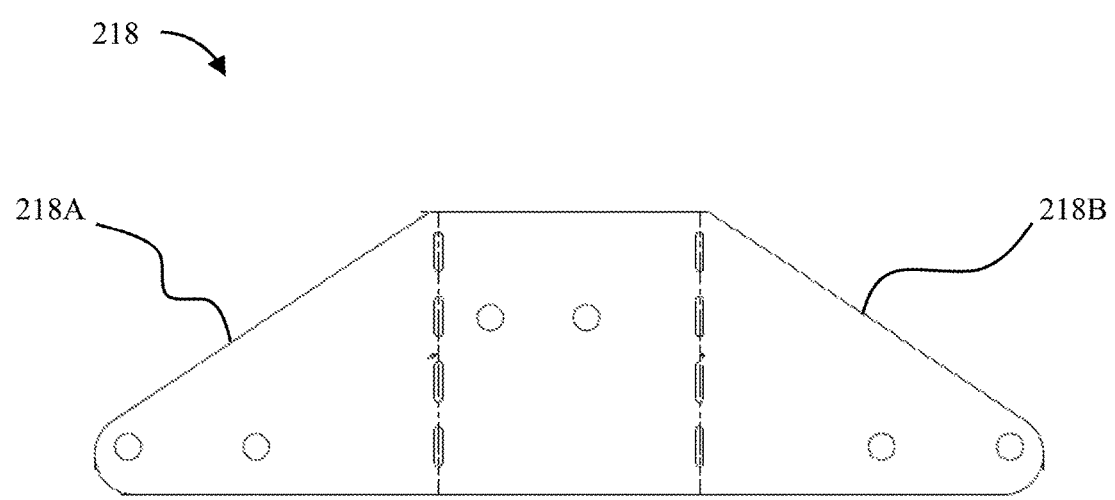
FIG. 6 is top view of a bracket that is part of the step system of FIG. 1.

As shown in FIG. 5, the magnet 216 is attached to the step frame 202 by the bracket 218, which is positioned adjacent to either the first mount 210A or the second mount 210B. As shown in FIG. 6, the bracket 218 has a first side portion 218A and a second side portion 218B that are configured to be disposed perpendicularly from the attached magnet 216. The first side portion 218A and the second side portion 218B can be coupled to the first side 206A or the second side 206B of the step frame 202. In certain embodiments, the bracket 218 is attached to the step frame 202 so that the magnet 216 is oriented to be approximately parallel to a side of the recreational vehicle 100 when the step frame 202 is in the installed position. In certain embodiments, the bracket 218 is positioned below either the first mount 210A or the second mount 210B to prevent damage to the step system 200. For example, the bracket 218 can be positioned such that it is not normally in contact with any surface whether in the installed position or the uninstalled position. in certain embodiments, the bracket 218 is positioned on a hinge side of the entrance door 104 to prevent the magnet 216 from coming into contact with the recreational vehicle 100 and minimize incidental contact from people entering or exiting the recreational vehicle 100. The position of the bracket 218 further allows for easy replacement of the magnet 216 in the event that damage does occur.

In certain embodiments, the step system 200 could be sold as a kit. The kit may include, for example, the step frame 202, the magnet 216 to be attached to the bracket 218, the bracket 218 to be attached to the step frame 202, the magnetic proximity sensor 220, various fasteners for attaching the step system's components to each other and/or the recreational vehicle 100, and various electrical connectors and heat shrink tubing for electrical installation of the magnetic proximity sensor 220.

Although the disclosure has been described with reference to preferred embodiments, persons skilled in the art will recognize that changes may be made in form and detail without departing from the spirit and scope of the disclosed apparatus, systems and methods.

What is claimed is:

1. A step system for attaching to a recreational vehicle that includes an automatic step system, the step system comprising:
   a step frame configured to be removably coupled to the recreational vehicle and including a plurality of steps and a magnet; and
   a magnetic proximity sensor configured to disable the automatic step system when the step frame is in an installed position.

2. The step system of claim 1, wherein the magnet is positioned in proximity to the magnetic proximity sensor when the step frame is in the installed position.

3. The step system of claim 1, wherein the magnetic proximity sensor is configured to disable the automatic step system by removing power supplied to the automatic step system.

4. The step system of claim 1, wherein the step frame includes a plurality of mounts.

5. The step system of claim 4, wherein the plurality of mounts each include a notch configured to engage with a corresponding bracket.

6. The step system of claim 1, wherein the step frame includes a handle.

7. The step system of claim 1, further comprising a bracket attached to the step frame, wherein the magnet is attached to the bracket.

8. The step system of claim 7, wherein the step frame includes a plurality of mounts, wherein the bracket is positioned adjacent at least one of the plurality of mounts.

9. A step system kit having component parts being capable of being assembled to be removably attached to a recreational vehicle to disable an automatic step system, the step system kit comprising the combination of:
   a step frame configured to be removably attached to the recreational vehicle, the step frame includes a plurality of steps and a magnet; and
   a magnetic proximity sensor configured to disable the automatic step system when the step frame is in an installed position.

10. The step system kit of claim 9, further comprising a bracket configured to be attached to the step frame.

11. The step system kit of claim 10, wherein the magnet is attached to the bracket.

12. The step system kit of claim 11, wherein the step frame includes a plurality of mounts.

13. The step system kit of claim 12, wherein the plurality of mounts each include a notch configured to engage with a corresponding bracket of the plurality of brackets.

14. The step system kit of claim 9, wherein the step frame includes a handle.

15. The step system kit of claim 9, further comprising a plurality of brackets configured to be mounted to the recreational vehicle.

16. The step system kit of claim 9, wherein the magnetic proximity sensor is configured to be mounted to the recreational vehicle.

17. The step system kit of claim 16, further comprising a plurality of fasteners to mount the magnetic proximity sensor to the recreational vehicle.

* * * * *